UNITED STATES PATENT OFFICE.

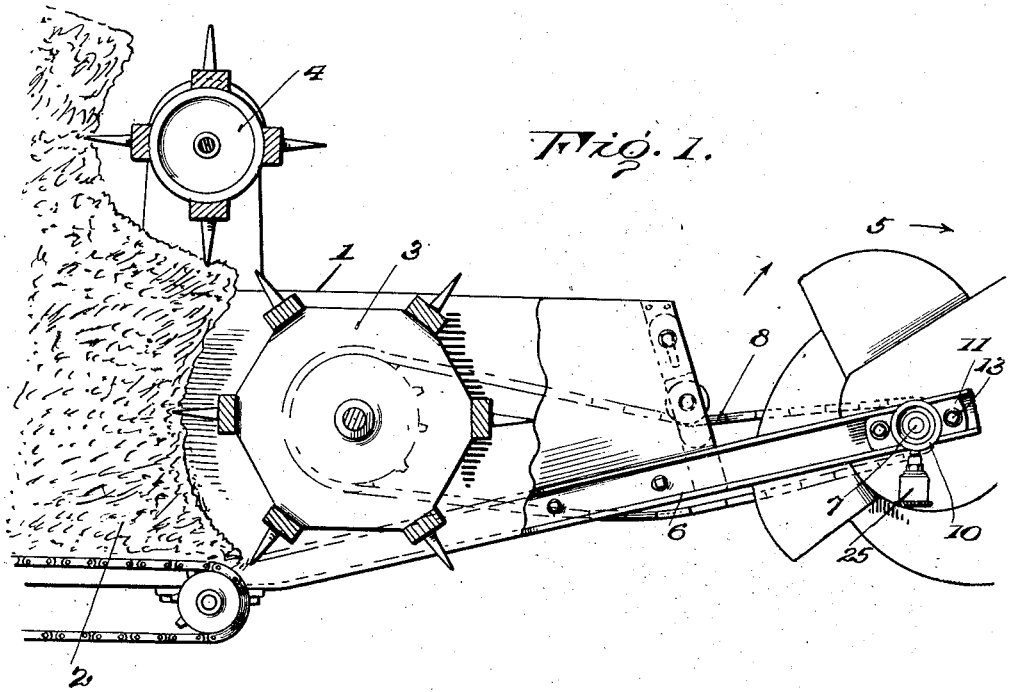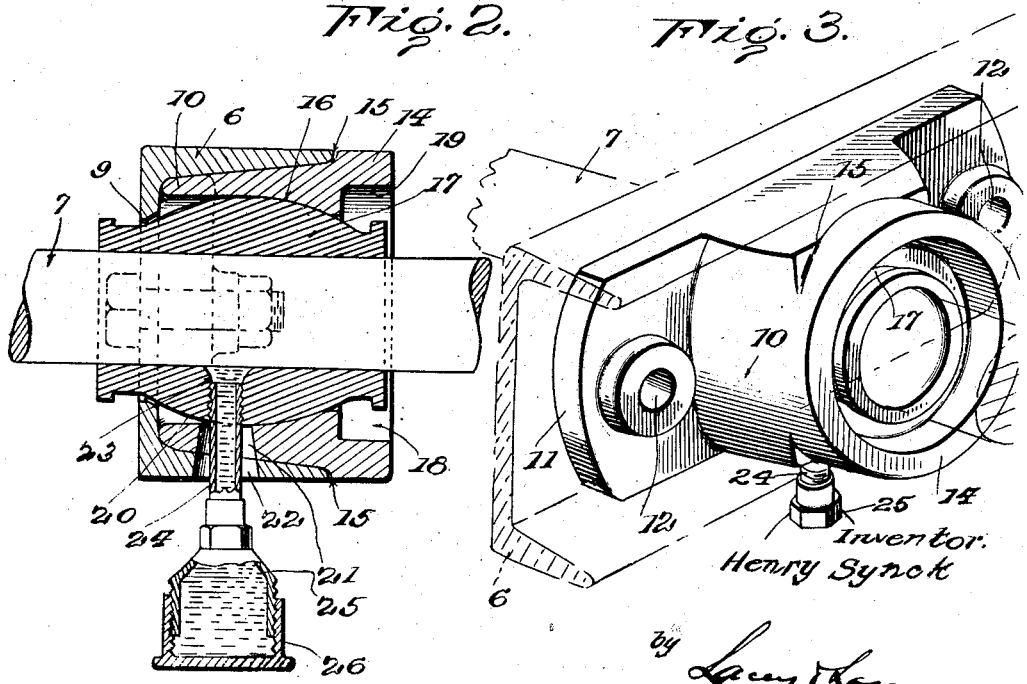
Inventor:
Henry Synck

HENRY SYNCK, OF COLDWATER, OHIO, ASSIGNOR, BY MESNE ASSIGNMENTS, TO THE NEW IDEA SPREADER COMPANY, OF COLDWATER, OHIO, A CORPORATION OF OHIO.

BEARING FOR SPREADER-SHAFTS.

1,389,606.     Specification of Letters Patent.     Patented Sept. 6, 1921.

Application filed March 9, 1920. Serial No. 364,464.

*To all whom it may concern:*

Be it known that I, HENRY SYNCK, citizen of the United States, residing at Coldwater, in the county of Mercer and State of Ohio, have invented certain new and useful Improvements in Bearings for Spreader-Shafts, of which the following is a specification.

Fertilizer distributers now extensively used are equipped with a spreading attachment supported from the frame of the machine at the rear end thereof. As now constructed, the distributer shaft is supported by and between two channeled arms extending rearwardly from the sides of the bed or box constituting the body of the machine, the bearings for the shaft consisting of mating members, one of which is bolted to the adjacent channeled arm and extends rearwardly beyond the end thereof, while the mating member fits around the shaft and is bolted to the first-mentioned member at the rear side of the same. A bearing sleeve surrounds the shaft and is held by and between the mating members and has a swiveled engagement therewith so that the distributer shaft will tend to remain horizontal under the vibrations of the machine as it is drawn over a field. The outer mating member also carries a lubricator cup which projects upwardly and rearwardly and directs lubricant onto the shaft, the opening through the outer member being large enough to permit play of the cup so that it may follow the movements of the sleeve. This arrangement is objectionable for the reason that the bearing is in rear of the arm which carries it and is, therefore, weak and the supporting members or the mating members inclosing the sleeve are apt to be broken or bent by chance blows. Moreover, the construction presents numerous projections on which straw and strings contained in the fertilizer would catch and wrap around the ears of the bearing or the lubricator cup or other projecting parts. When the strings and straw wrap around the bearing they also tend to wrap around the spreader shaft and retard its rotation within the sleeve.

It is the object of my present invention to provide a bearing which will be stronger than the construction formerly used and which will present no projections upon which strings or straw may wrap while possessing all the flexibility possessed by the old arrangement. This object I attain in such a construction and arrangement of parts as is illustrated in the accompanying drawings and the invention resides in certain novel features which will be particularly pointed out in claims following a detailed description.

In the drawings—

Figure 1 is a view, partly in longitudinal section and partly in side elevation, of a portion of a fertilizer distributer showing my improved bearing in place and supporting the distributer shaft;

Fig. 2 is a transverse section through the bearing;

Fig. 3 is an enlarged perspective view of the bearing.

In the drawings, the reference numeral 1 indicates a portion of one side of the wagon box or bed in which the fertilizer, indicated at 2, is loaded and 3 and 4 indicate the distributing cylinders or beaters by the action of which the fertilizer is shredded and thrown rearwardly onto the distributer, indicated at 5. The supporting arms 6 are secured rigidly to the sides 1 and extend rearwardly therefrom, the distributer shaft 7 being supported transversely of the machine near the rear ends of said arms and being equipped at one end with a sprocket around which a chain 8 is trained so that the distributer shaft will be driven from the lower beater shaft or from some other moving part of the apparatus as will be readily understood. The supporting arms 6 are channel bars, as shown most clearly in Fig. 2, and in carrying out my present invention, I drill through the said bars near the rear ends thereof a series of three holes, the middle one of which, 9, is large enough to receive an end of the bearing sleeve while the end holes of the series are intended to receive bolts whereby the bearing bracket or casting 10 may be secured in position. The bearing bracket or casting 10 comprises a base plate 11 which is of proper dimensions to fit closely between the flanges of the supporting bars 6 and is provided at its ends with openings 12 to receive the securing bolts 13, as will be readily understood. The upper and lower sides of the base member will be inclined or beveled, as shown in Fig. 2, so as to conform to the inclination of the faces of the flange members of the channel- -supporting bars and at its center the casting or bracket is constructed with a tubular boss or enlargement 14, the end of which is somewhat greater in diameter than the width of the base whereby a shoulder 15 is provided to abut the edges of the channel bar flanges, the abutting surfaces serving to maintain the relative position of the parts and tending to prevent relative movement while relieving the strain upon the securing bolts 13. The bore of the tubular member 14 of the casting is tapered toward its end more remote from the vertical web of the supporting channel bar, as shown at 16, so that the said bore presents a socket to receive the sleeve 17 and permit a slight rocking movement of said sleeve as will be readily understood on reference to Fig. 2. The end of the tubular or socket member 14 distant from the web of the channel supporting bar is provided with an internal circular chamber 18 which may be considered as an annular enlargement of the tapered bore 16, an overhanging flange 19 being thereby produced which will act as a guard around the inner end of the journal sleeve 17 to prevent straw or strings wrapping around the same. The said sleeve 17 has a cylindrical bore in which the distributer shaft 7 is rotatably fitted and the intermediate portion of the said sleeve is annularly expanded, as shown at 20, so that it, in effect, forms a ball seating in the socket 16 of the casting 10 and effects a ball and socket joint therewith. One end of the sleeve extends through the opening 9 in the channel bar while the other end is disposed within the chamber or annular recess 18 of the casting, as clearly shown in Fig. 2.

In the lower wall of the casting or bracket 10, I provide an opening 21 which registers with a similar opening 22 in the lower flange of the supporting arm and in the lower side of the journal sleeve 17 is formed an opening 23 into which is threaded the extremity of a tube 24 forming the outlet from a grease cup 25. It will be readily understood that I contemplate the use of a hard or semi-solid lubricant and the cap 26 of the cup is capable of use as a follower to force the lubricant to the distributer shaft so that that portion of the lubricant immediately adjacent the shaft will be melted as the shaft rotates and will flow or tend to flow through the bearing to lubricate the same and prevent excessive heating.

From the foregoing description, taken in connection with the accompanying drawings, it will be readily seen that I have provided an exceedingly simple and compact structure which will be entirely free of projections on which the straw, twine or other string-like matter contained in the fertilizer may catch and wrap and that I have also provided a very strong bearing inasmuch as it is disposed in advance of the rear extremity of the supporting arm and is braced through the engagement of the top and bottom of the bearing bracket or casting with the flange members of the supporting arm.

The ball and socket form of joint between the swiveled journal sleeve and the bracket inclosing said sleeve permits ready adjustment of the shaft so that twisting strain thereon will be avoided even though the supporting arms at the opposite sides of the machine may be slightly out of alinement, and also permits the shaft to accommodate itself to the tendency of the driving chain to pull forward on that end of the shaft upon which it operates.

Having thus described the invention, what is claimed as new is:

1. The combination with a channeled supporting arm, of a bracket secured against the side of said arm between the flange members thereof and having a central socket member projecting laterally away from the side of the arm between the flange members of the same, and a journal sleeve extending through the side of the arm and through said central socket member of the bracket and having swiveled engagement therewith.

2. The combination of a channeled supporting arm, a bearing bracket secured within the channel of said arm and provided with shoulders abutting the edges of the flange members thereof, said bracket being provided with a central socket member, and a bearing sleeve extending through and swiveled in said socket member.

3. The combination of a supporting arm, a bearing bracket secured against the side of said arm and having a central socket member projecting from that face remote from the side of the arm, said socket member being provided with an annular flange at its free end, and a bearing sleeve swiveled in said socket member and having one end housed within said flange.

4. The combination of a supporting arm, a bearing bracket secured rigidly against one side of said arm and having a central tubular member projecting laterally away from the supporting arm, said tubular member having its bore tapered toward the end distant from the supporting arm and the supporting arm being provided with an opening registering with said bore, and a bearing sleeve extending through said bore and said opening and having its intermediate portion enlarged and forming a ball and socket joint with the bore of said tubular member.

In testimony whereof I affix my signature.

HENRY SYNCK. [L. S.]